United States Patent
Ge et al.

(10) Patent No.: US 12,227,090 B2
(45) Date of Patent: Feb. 18, 2025

(54) CONTROL SIGNAL MODIFICATION TO PRECLUDE PHASE COINCIDENTAL SWITCHING

(71) Applicant: FORD GLOBAL TECHNOLOGIES, LLC, Dearborn, MI (US)

(72) Inventors: Baoming Ge, Okemos, MI (US); Lihua Chen, Farmington Hills, MI (US); Serdar Hakki Yonak, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 252 days.

(21) Appl. No.: 18/063,370

(22) Filed: Dec. 8, 2022

(65) Prior Publication Data
US 2024/0190267 A1   Jun. 13, 2024

(51) Int. Cl.
*H02M 3/158*   (2006.01)
*B60L 3/12*    (2006.01)
*B60L 50/11*   (2019.01)
*B60L 50/52*   (2019.01)

(52) U.S. Cl.
CPC ............ *B60L 50/52* (2019.02); *B60L 3/12* (2013.01); *B60L 50/11* (2019.02); *B60L 2210/10* (2013.01)

(58) Field of Classification Search
CPC .... H02M 3/1584; H03K 5/1515; B60L 50/52; B60L 50/11; B60L 3/12; B60L 2210/10
See application file for complete search history.

(56) References Cited

U.S. PATENT DOCUMENTS

| | | | |
|---|---|---|---|
| 8,760,891 B2 | 6/2014 | Lloyd et al. | |
| 9,553,540 B2 | 1/2017 | Degner et al. | |
| 9,906,167 B2 | 2/2018 | Degner et al. | |
| 9,960,726 B1 | 5/2018 | Degner et al. | |
| 11,283,429 B1* | 3/2022 | Seow | H03K 5/1515 |
| 2010/0033237 A1* | 2/2010 | Liang | H02M 3/1584 |
| | | | 327/543 |

OTHER PUBLICATIONS

"A Novel IGBT Gate Driver to Eliminate the Dead-Time Effect", pp. 1-5, IAS 2005 0-7803-9208-6/05/$20.00 IEEE.

* cited by examiner

*Primary Examiner* — Cortez M Cook
(74) *Attorney, Agent, or Firm* — David B. Kelley; Brooks Kushman P.C.

(57) ABSTRACT

While a voltage at a gate of one of a pair of series connected switches of a phase leg is greater than a threshold value, circuitry generates a signal with a logical value that precludes a gate driver corresponding to a gate of the other of the pair of series connected switches from driving the gate of the other of the pair of series connected switches.

20 Claims, 5 Drawing Sheets

CONTROL SIGNAL MODIFICATION TO PRECLUDE PHASE COINCIDENTAL SWITCHING

TECHNICAL FIELD

This disclosure relates to vehicle power systems and the control thereof.

BACKGROUND

Certain vehicles may be propelled by electric machines that convert electrical energy to mechanical energy. This electrical energy may be provided from traction batteries or other energy storage devices. Power conversion components may be used to condition the electrical energy used by the electric machines.

SUMMARY

A power converter includes a pair of series connected switches arranged to define a phase leg and a pair of gate drivers. Each of the gate drivers is arranged to drive a corresponding gate of one of the switches. The power converter also includes circuitry that precludes one of the gate drivers from driving the corresponding gate of the one of the switches responsive to a voltage at the gate of the other of the switches exceeding a threshold value regardless of a state of a control signal provided to the circuitry.

A method includes, while a voltage at a gate of one of a pair of series connected switches of a phase leg is greater than a threshold value, generating a signal with a logical value that precludes a gate driver corresponding to a gate of the other of the pair of series connected switches from driving the gate of the other of the pair of series connected switches.

A power converter includes a pair of series connected switches arranged to define a phase leg and a pair of gate drivers. Each of the gate drivers is arranged to drive a corresponding gate of one of the switches. The power converter also includes circuitry that precludes one of the gate drivers from driving the corresponding gate of the one of the switches responsive to a current through the other of the switches exceeding a threshold value regardless of a state of a control signal provided to the circuitry.

BRIEF DESCRIPTION OF THE DRAWINGS

In the following detailed description, reference is made to the accompanying figures, which form a part thereof, and in which are shown by way of illustration specific embodiments. Other embodiments, of course, are also contemplated and/or described.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1A:
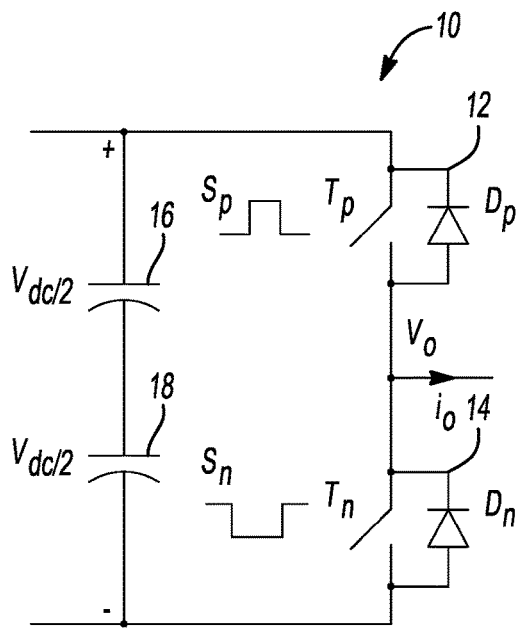
FIG. 1A is a schematic diagram of a portion of a voltage source inverter.

To preclude circumstances in which the upper and lower switches of a phase leg in a voltage source inverter (VSI) or DC-DC converter are on at a same time, delay time, a small interval during which both the upper and lower switches are off is introduced into the standard pulse width modulation (PWM) control of VSIs or DC-DC converters. Referring to FIG. 1A, a portion of a VSI 10 includes upper and lower switches 12, 14 that define a phase leg, and a pair of series connected capacitors 16, 18 in parallel with the switches. Such a blanking time, however, can cause output waveform distortion and fundamental voltage loss, especially when the output voltage is low.

Figure 1C:
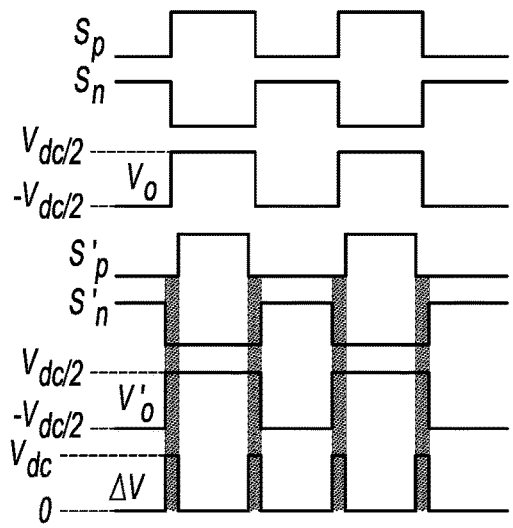
FIGS. 1B ($\Delta V$ at $i_o > 0$) and 1C ($\Delta V$ at $i_o < 0$) are pulse width modulation signal plots for the switches of FIG. 1A.
Figure 1B:
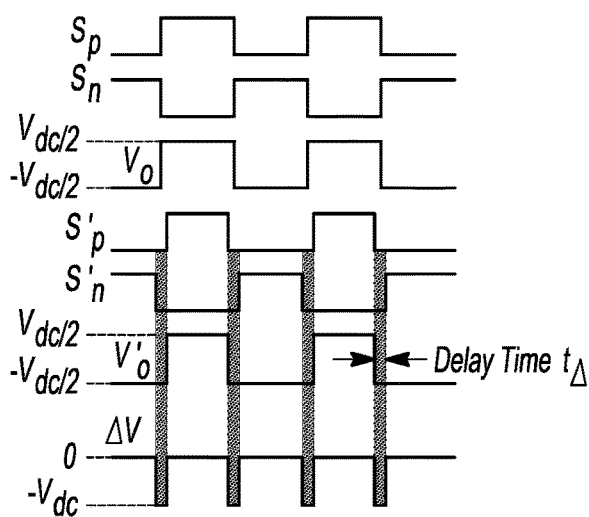

Referring to FIGS. 1B and 1C, the output voltage error caused by delay time can be mathematically depicted as $$\Delta V = (2 t_\Delta / T_s) V_{dc} \times \text{sgn}(i_o)$$

where $t_\Delta$ is the delay time interval, $T_s$ is the carrier switching period, $V_{dc}$ is the DC bus voltage, and $i_o$ is the load current.

Figure 2:
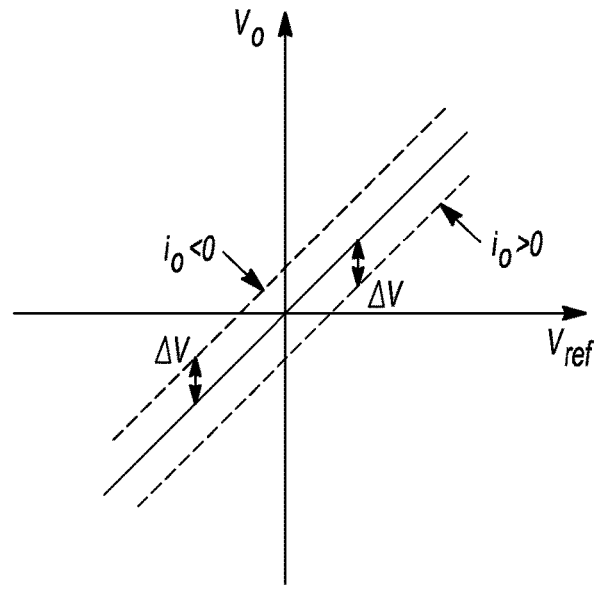
FIG. 2 is a plot illustrating output distortion effects due to delay time.

Also, the effect of the delay time on the output voltage can be illustrated in FIG. 2. If there is no deadtime, $V_o = V_{ref}$; with the delay time, $V_o = V_{ref} + \Delta V$. This delay time effect becomes evident when the modulation index is small because of the increase of the ratio of $\Delta V / V_o$.

To overcome delay time effects, many solutions focus on delay time compensation by introducing complicated PWM compensators. In practice, the delay time varies with the gate drive path propagation delay, device characteristics and output current, as well as temperature, which makes the compensation less effective, especially at low output current, low frequency, and zero current crossing.

Figure 3:
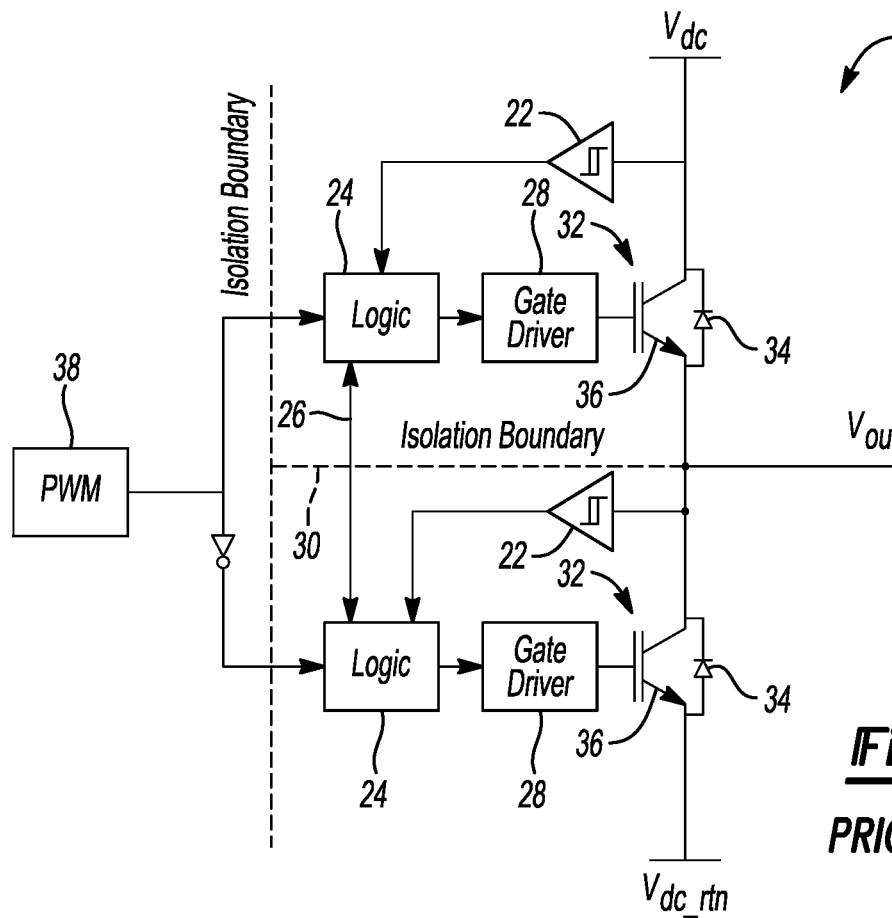
FIG. 3 is a schematic diagram of a prior art conduction detection circuit for a phase leg.

Referring to FIG. 3, a prior art conduction detection circuit (CDC) 20 includes comparator circuitry 22, circuitry 24, and communication 26. The CDC 20 also provides communication between adjacent gate drives 28. A typical method is indicated by the communication 26 because this path crosses communication boundary 30 only once. The CDC 20 may sense the collector-emitter voltage of a local switch, such as an insulated-gate bipolar transistor (IGBT) 32 and may determine if the IGBT 32 is conducting, diode 34 is conducting, or neither. The function of the CDC 20 may be accomplished by determining the polarity of a collector-emitter signal 36 through use of a window comparator circuit. The CDC 20 further includes PWM logic 38.

Figure 4:
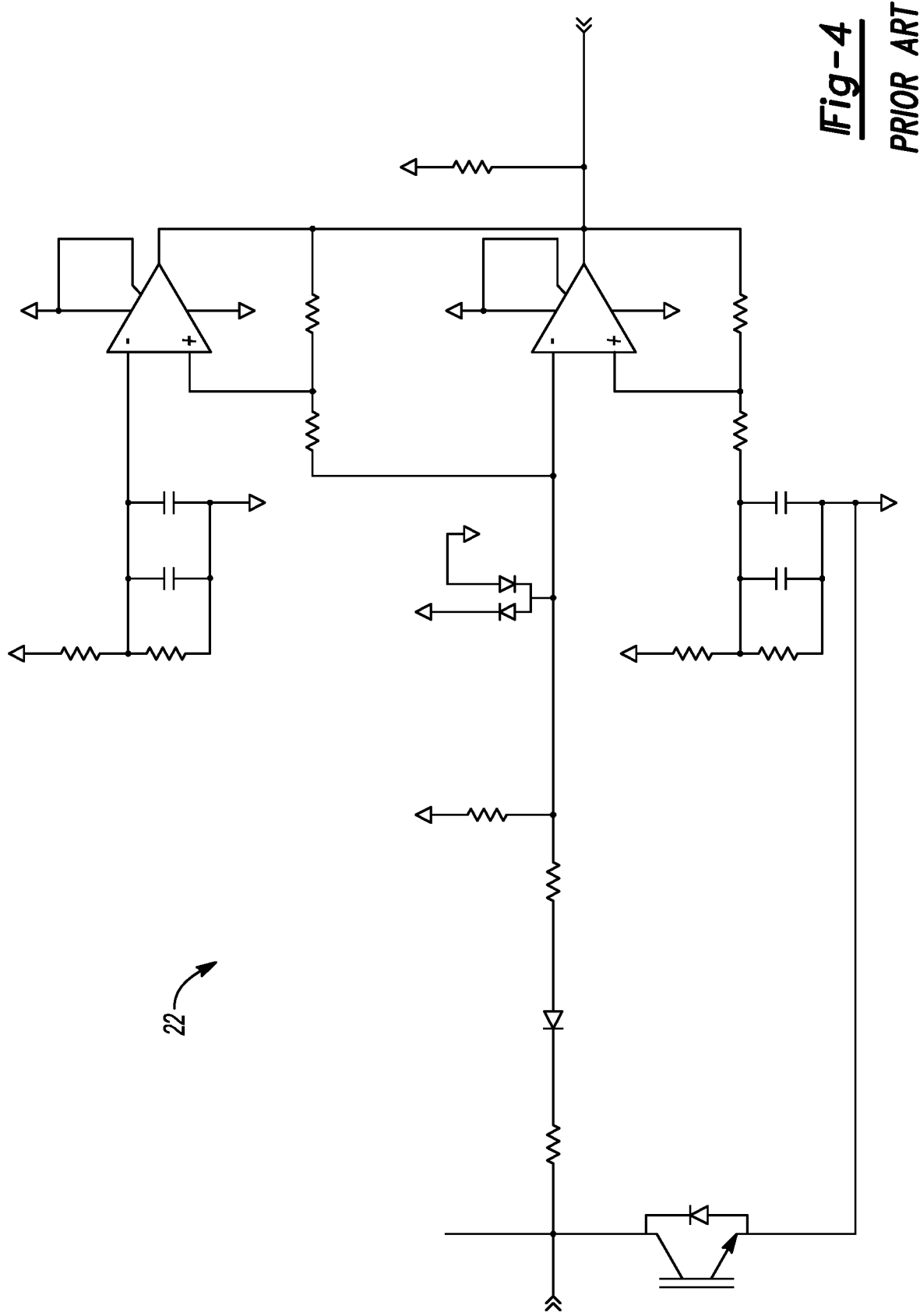
FIG. 4 is a schematic diagram of the prior art comparator circuitry of FIG. 3.

Referring to FIG. 4, the prior art comparator circuitry 22 can be implemented as illustrated.

Three states (IGBT conducting, diode conducting, and device OFF) of each of the switches 32 are thus used to decide when the switches 32 should be turned on. Also, the communication 26 is required between the circuits 24. This hardware implementation is complex, and it measures high collector-emitter voltage on the device.

Figure 5:
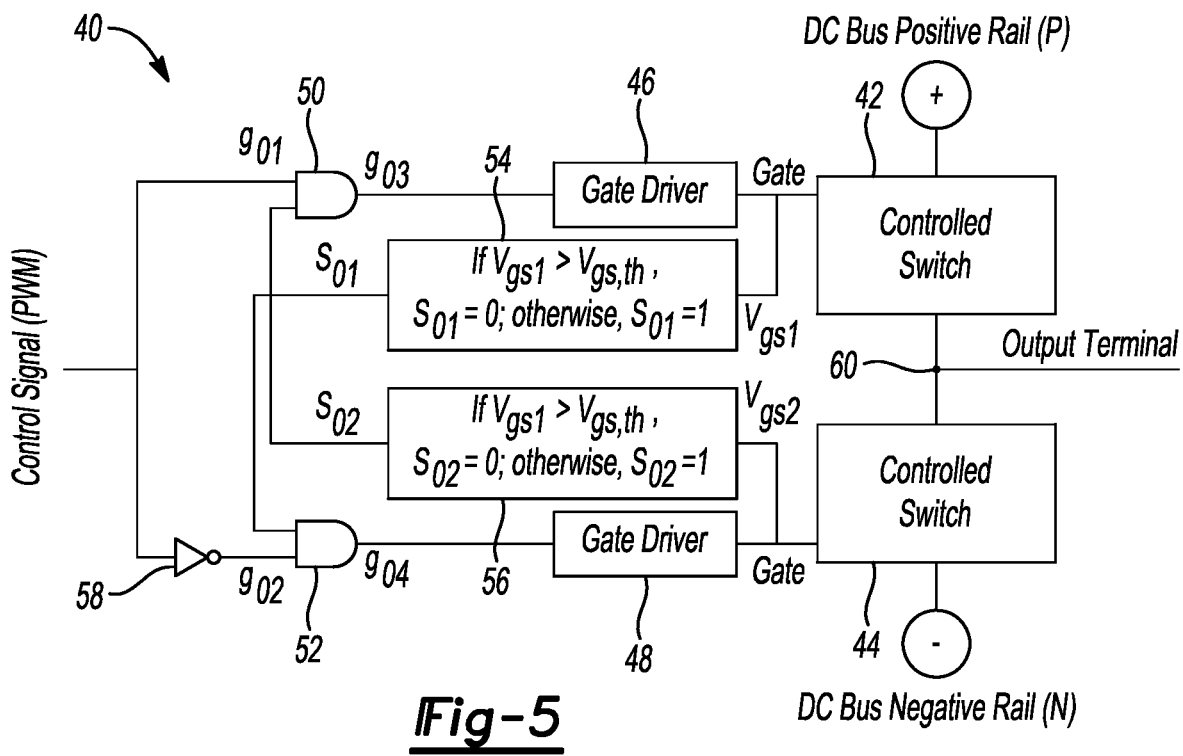
FIG. 5 is a schematic diagram of circuitry for eliminating delay time by detecting device gate voltages.

Here, a simpler strategy is proposed to eliminate the delay time. It detects the gate voltage (i.e., Vge or Vgs, 20V or lower) or device current to decide when the switches should be turned on. Referring to FIG. 5, a portion of a power converter 40 includes upper and lower switches 42, 44 that form a phase leg between DC bus positive and negative rails of the power converter 40, gate drivers 46, 48, AND gates 50, 52, logic circuitry (e.g., hardware comparators) 54, 56, and inverter 58. The switches 42, 44 are center tapped with output terminal 60. The gate drivers 46, 48 respectively drive gates of the switches 42, 44. The AND gate 50 receives control signal $g_{01}$ (a PWM control signal) and output signal $S_{02}$ from the logic circuitry 56. The AND gate 52 receives control signal $g_{02}$ (the inverted PWM control signal) and output signal $S_{01}$ from the logic circuitry 54.

When $V_{gs1}$, the voltage at the gate of the switch 42, is greater than $V_{gs,ths}$, a threshold voltage, the logic circuitry 54 is such that $S_{01}$, the output signal of the logic circuitry 54, is zero (low). Otherwise, $S_{01}$ is one (high). When $V_{gs2}$, the voltage at the gate of the switch 44, is greater than $V_{gs,ths}$, the logic circuitry 56 is such that $S_{02}$, the output signal of the logic circuitry 56, is low. Otherwise, $S_{02}$ is high.

When $g_{01}$ is high and $S_{02}$ is high, which means $V_{gs2}$ is less than $V_{gs,ths}$, $g_{03}$, the control signal output by the AND gate 50, will be high, activating the gate driver 46 to drive the gate of the switch 42 such that the switch 42 conducts. When $S_{02}$ is low, which means $V_{gs2}$ is greater than $V_{gs,ths}$ (likely because the switch 44 is conducting), $g_{03}$ will be low whether $g_{01}$ is high or low preventing the gate driver 46 from driving the gate of the switch 42 and thus preventing the switch 42 from conducting.

When $g_{02}$, which is the inverse of $g_{01}$ and does not have any delay time relative to $g_{01}$, is high and Son is high, which means $V_{gs1}$ is less than $V_{gs,ths}$, $g_{04}$, the control signal output by the AND gate 52, will be high, activating the gate driver 48 to drive the gate of the switch 44 such that the switch 44 conducts. When $S_{01}$ is low, which means $V_{gs1}$ is greater than $V_{gs,ths}$ (likely because the switch 42 is conducting), $g_{04}$ will be low whether $g_{02}$ is high or low preventing the gate driver 48 from driving the gate of the switch 44 and thus preventing the switch 44 from conducting.

In one example, $V_{gs1}$ and $V_{gs2}$ are less than 20V and $V_{gs,ths}$ is 3.5V. And, the switches 42, 44 are silicon-carbide metal-oxide-semiconductor field-effect transistors and the turn on gate-source voltage is 15V-18V. Other parameter values are also contemplated.

Figure 6:
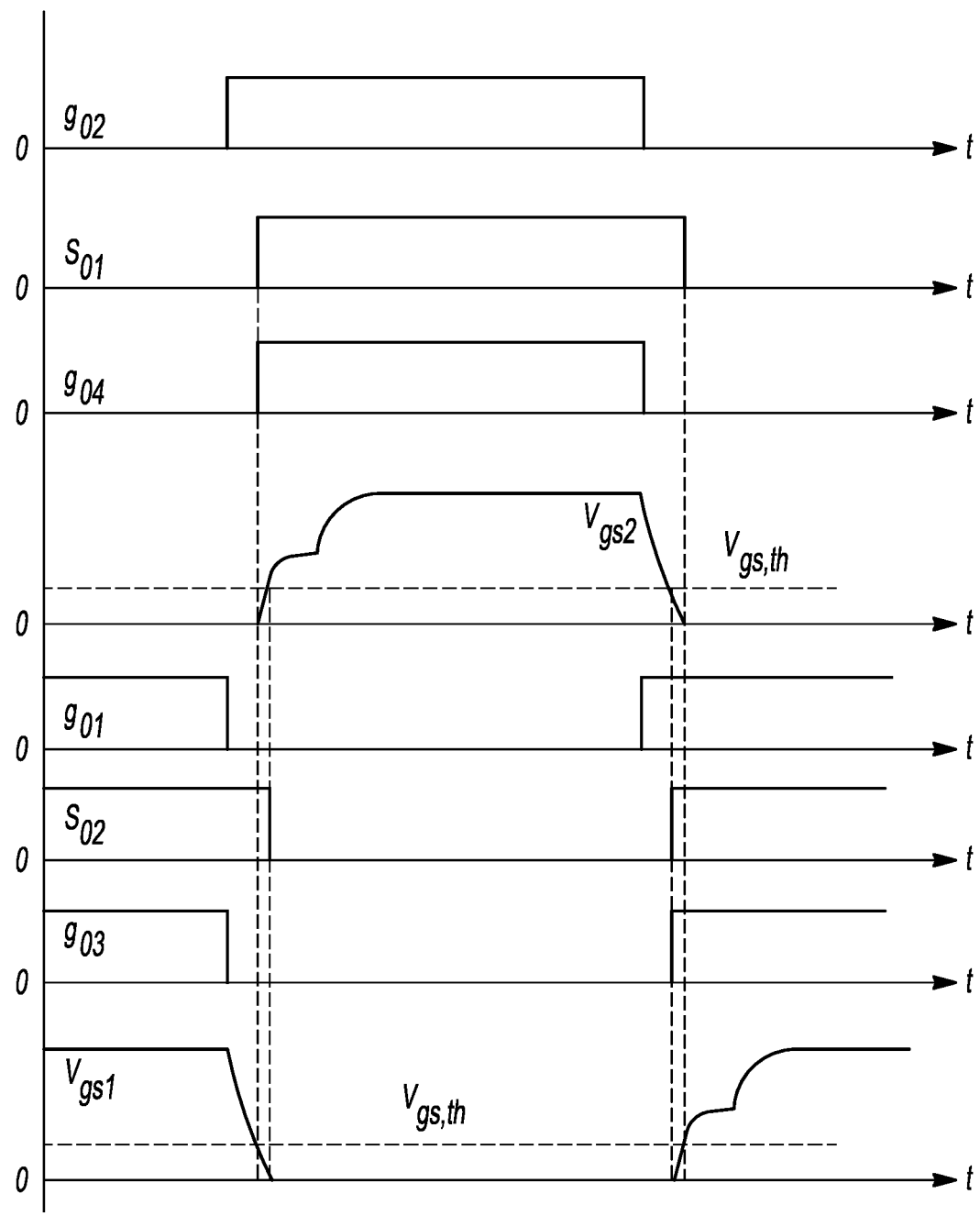
FIG. 6 is a plot of various controls signals and voltages versus time for the circuitry of FIG. 5.

Referring to FIG. 6, low levels of $S_{01}$ and $S_{02}$ represent the switch gate voltages $V_{gs1}$ and $V_{gs2}$ larger than the threshold voltage $V_{gs,th}$. If the switch 42 attempts to turn ON, but the gate voltage of the switch 44 is greater than $V_{gs,th}$ (i.e., $S_{02}=0$), the switch 42 will be kept OFF even though there is an ON command (i.e., $g_{01}$ is high) until the gate voltage of the switch 44 is less than the threshold voltage $V_{gs,th}$. If the switch 44 attempts to turn ON, but the gate voltage of the switch 42 is greater than $V_{gs,th}$ (i.e., $S_{01}=0$), the switch 44 will be kept OFF even though there is an ON command (i.e., $g_{02}$ is high) until the gate voltage of the switch 42 is less than the threshold voltage $V_{gs,th}$. In summary, each of the switches 42, 44 will not turn ON until its opposite switch is fully OFF; the switch with the OFF command will turn OFF on time.

Figure 7:
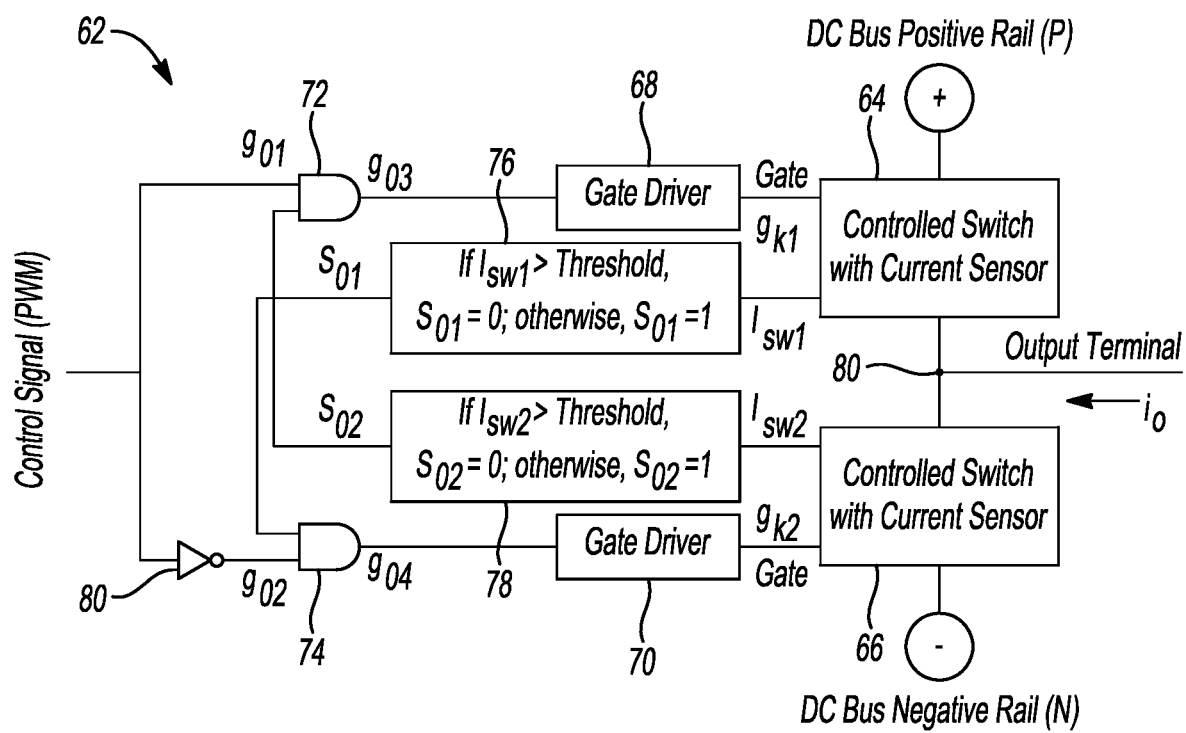
FIG. 7 is a schematic diagram of circuitry for eliminating delay time by detecting device currents.

Referring to FIG. 7, a portion of a power converter 62 includes upper and lower switches 64, 66 that form a phase leg between DC bus positive and negative rails of the power converter 62, gate drivers 68, 70, AND gates 72, 74, logic circuitry (e.g., hardware comparators), 76, 78, and inverter 80. The switches 64, 66 are center tapped with output terminal 80. The gate drivers 68, 70 respectively drive gates of the switches 64, 66. The AND gate 72 receives control signal $g_{01}$ (a PWM control signal) and output signal $S_{02}$ from the logic circuitry 78. The AND gate 74 receives control signal $g_{02}$ (the inverted PWM control signal) and output signal $S_{01}$ from the logic circuitry 76.

When $I_{sw1}$, the current through the switch 64, is greater than a threshold current, the logic circuitry 76 is such that $S_{01}$, the output signal of the logic circuitry 76, is zero (low). Otherwise, $S_{01}$ is one (high). When $I_{sw2}$, the current through the switch 66, is greater than the threshold current, the logic circuitry 78 is such that $S_{02}$, the output signal of the logic circuitry 78, is low. Otherwise, $S_{02}$ is high.

When $g_{01}$ is high and $S_{02}$ is high, which means $I_{sw2}$ is less than the current threshold, $g_{03}$, the control signal output by the AND gate 72, will be high, activating the gate driver 68 to drive the gate of the switch 64 such that the switch 64 conducts. When $S_{02}$ is low, which means $I_{sw2}$ is greater than the current threshold (likely because the switch 66 is conducting), $g_{03}$ will be low whether $g_{01}$ is high or low preventing the gate driver 68 from driving the gate of the switch 64 and thus preventing the switch 64 from conducting.

When $g_{02}$, which is the inverse of $g_{01}$ and does not have any delay time relative to $g_{01}$, is high and Son is high, which means $I_{sw1}$ is less than the current threshold, $g_{04}$, the control signal output by the AND gate 74, will be high, activating the gate driver 70 to drive the gate of the switch 66 such that the switch 66 conducts. When $S_{01}$ is low, which means $I_{sw1}$ is greater than the current threshold (likely because the switch 64 is conducting), $g_{04}$ will be low whether $g_{02}$ is high or low preventing the gate driver 70 from driving the gate of the switch 66 and thus preventing the switch 66 from conducting.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of these disclosed materials. Parameters such as voltages and currents, for example, can be measured/sensed using any suitable technology including voltage sensors, current sensors, etc. The thresholds contemplated herein can be determined via simulation, testing, etc., and depend on particular applications. And, the logic circuitry can take other suitable forms aside from, for example, hardware comparators.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A power converter comprising:
a pair of series connected switches arranged to define a phase leg;
a pair of gate drivers, each of the gate drivers arranged to drive a corresponding gate of one of the switches; and
circuitry configured to preclude one of the gate drivers from driving the corresponding gate of the one of the switches responsive to a voltage at the gate of the other of the switches exceeding a threshold value regardless of a state of a control signal provided to the circuitry.

2. The power converter of claim 1, wherein the circuitry includes logic circuitry configured to output a logical zero responsive to the voltage exceeding the threshold value, and to output a logical one otherwise.

3. The power converter of claim 2, wherein the circuitry further includes an AND gate configured to receive output of the logic circuitry and the control signal, and to selectively generate a drive signal for the one of the gate drivers based on the output of the logic circuitry and the control signal.

4. The power converter of claim 3, wherein the circuitry further includes an additional AND gate configured to receive a complement of the control signal.

5. The power converter of claim 4, wherein the circuitry further includes additional logic circuitry configured to output a logical zero responsive to a voltage at the gate of the one of the switches exceeding the threshold value, and to output a logical one otherwise.

6. The power converter of claim 5, wherein the additional AND gate is further configured to receive output of the additional logic circuitry, and to selectively generate a drive signal for the other of the gate drivers based on the output of the additional logic circuitry and the complement of the control signal.

7. The power converter of claim 1, wherein the control signal is a pulse width modulation signal.

8. The power converter of claim 1, wherein the switches are field effect transistors.

9. A method comprising:
while a voltage at a gate of one of a pair of series connected switches of a phase leg is greater than a threshold value, generating a signal with a logical value that precludes a gate driver corresponding to a gate of the other of the pair of series connected switches from driving the gate of the other of the pair of series connected switches.

10. The method of claim 9 further comprising, while the voltage is less than the threshold value, generating the signal with a logical value that permits the gate driver to drive the gate of the other of the pair of series connected switches.

11. The method of claim 9, further comprising ANDing the signal and a control signal.

12. The method of claim 9, wherein the control signal is a pulse width modulation signal.

13. A power converter comprising:
a pair of series connected switches arranged to define a phase leg;
a pair of gate drivers, each of the gate drivers arranged to drive a corresponding gate of one of the switches; and
circuitry configured to preclude one of the gate drivers from driving the corresponding gate of the one of the switches responsive to a current through the other of the switches exceeding a threshold value regardless of a state of a control signal provided to the circuitry.

14. The power converter of claim 13, wherein the circuitry includes logic circuitry configured to output a logical zero responsive to the current exceeding the threshold value, and to output a logical one otherwise.

15. The power converter of claim 14, wherein the circuitry further includes an AND gate configured to receive output of the logic circuitry and the control signal, and to selectively generate a drive signal for the one of the gate drivers based on the output of the logic circuitry and the control signal.

16. The power converter of claim 15, wherein the circuitry further includes an additional AND gate configured to receive a complement of the control signal.

17. The power converter of claim 16, wherein the circuitry further includes additional logic circuitry configured to output a logical zero responsive to a current through the one of the switches exceeding the threshold value, and to output a logical one otherwise.

18. The power converter of claim 17, wherein the additional AND gate is further configured to receive output of the additional logic circuitry, and to selectively generate a drive signal for the other of the gate drivers based on the output of the additional logic circuitry and the complement of the control signal.

19. The power converter of claim 13, wherein the control signal is a pulse width modulation signal.

20. The power converter of claim 1, wherein the switches are field effect transistors.

* * * * *